(12) United States Patent
Santiago-Anadon

(10) Patent No.: US 9,651,078 B2
(45) Date of Patent: May 16, 2017

(54) TORQUE LIMITING FASTENER

(71) Applicant: Jose Ricardo Santiago-Anadon, Mountain Brook, AL (US)

(72) Inventor: Jose Ricardo Santiago-Anadon, Mountain Brook, AL (US)

(*) Notice: Subject to any disclaimer, the term of this patent is extended or adjusted under 35 U.S.C. 154(b) by 5 days.

(21) Appl. No.: 14/862,953

(22) Filed: Sep. 23, 2015

(65) Prior Publication Data
US 2016/0084289 A1   Mar. 24, 2016

Related U.S. Application Data

(60) Provisional application No. 62/054,075, filed on Sep. 23, 2014.

(51) Int. Cl.
*F16B 31/00* (2006.01)
*F16B 31/02* (2006.01)
*F16B 23/00* (2006.01)

(52) U.S. Cl.
CPC .......... *F16B 31/027* (2013.01); *F16B 23/003* (2013.01)

(58) Field of Classification Search
CPC ...... F16B 23/003; F16B 31/02; F16B 31/024; F16B 31/027; F16B 31/00; B25B 23/14; B25B 23/1422; B25B 23/1427
USPC .......................................... 411/1, 3, 6, 9, 11
See application file for complete search history.

(56) References Cited

U.S. PATENT DOCUMENTS

| | | | | |
|---|---|---|---|---|
| 3,709,087 A | * | 1/1973 | Stone, Jr. | F16B 31/02 411/6 |
| 3,854,372 A | * | 12/1974 | Gutshall | F16B 1/0071 411/1 |
| 4,527,406 A | * | 7/1985 | Baker | B60K 15/0409 220/210 |
| 5,795,116 A | * | 8/1998 | Frank | F16B 31/02 411/1 |
| 5,857,816 A | * | 1/1999 | Assmundson | F16B 31/02 411/1 |
| 6,322,108 B1 | * | 11/2001 | Riesselmann | F16L 15/00 285/3 |
| 7,225,710 B2 | * | 6/2007 | Pacheco, Jr. | B25B 13/065 411/403 |
| 8,875,368 B2 | * | 11/2014 | O'Sullivan | F16B 31/021 29/426.2 |
| 2009/0133980 A1 | * | 5/2009 | Swaim | F16D 7/048 192/45.1 |

* cited by examiner

*Primary Examiner* — Roberta Delisle
(74) *Attorney, Agent, or Firm* — Dunlap Bennett & Ludwig PLLC

(57) ABSTRACT

A torque-limiting fastener assembly, comprising: a fastener body having an externally threaded shaft and a drivable head, said head being provided with elements adapted for frictional contact with a driver capable of delivering torque to said threaded shaft, wherein said elements comprise flexible flanges/toggles that deflect at a predetermined torque to prevent further frictional contact between said driver and said head elements that is sufficient to drive said fastener.

3 Claims, 4 Drawing Sheets

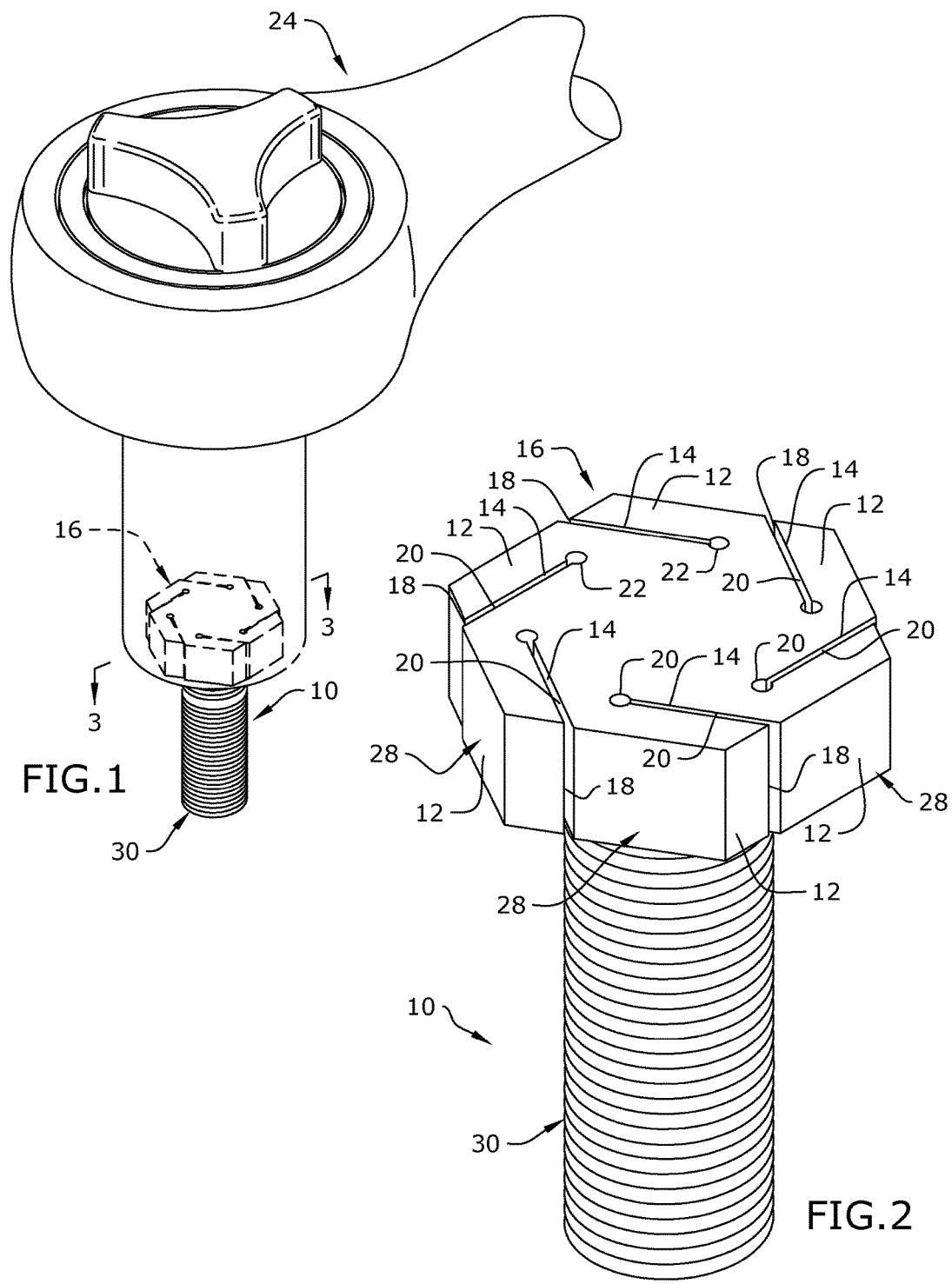

TORQUE LIMITING FASTENER

CROSS-REFERENCE TO RELATED APPLICATION

This application claims the benefit of priority of U.S. provisional application No. 62/054,075, filed Sep. 23, 2014, the contents of which are herein incorporated by reference.

BACKGROUND OF THE INVENTION

The present invention relates to fasteners and, more particularly, to fasteners having an externally threaded shaft and a drivable head, the head being provided with elements adapted for frictional contact with a driver capable of delivering torque to the threaded shaft.

As can be seen, there is a need for such fasteners that are not subject to over-torqueing.

SUMMARY OF THE INVENTION

In one aspect of the present invention, there is provided a torque-limiting fastener assembly, comprising: a fastener body having an externally threaded shaft and a drivable head, the head being provided with elements adapted for frictional contact with a driver capable of delivering torque to the threaded shaft, wherein the elements comprise flexible flanges/toggles that deflect at a predetermined torque to prevent further frictional contact between the driver and the head elements that is sufficient to drive said fastener.

These and other features, aspects and advantages of the present invention will become better understood with reference to the following drawings, description and claims.

BRIEF DESCRIPTION OF THE DRAWINGS

FIG. 1 is a perspective view of an embodiment of the invention shown being tightened by a driving tool.

FIG. 2 is an elevational view of an embodiment of the invention.

DETAILED DESCRIPTION OF THE INVENTION

Figure 3:
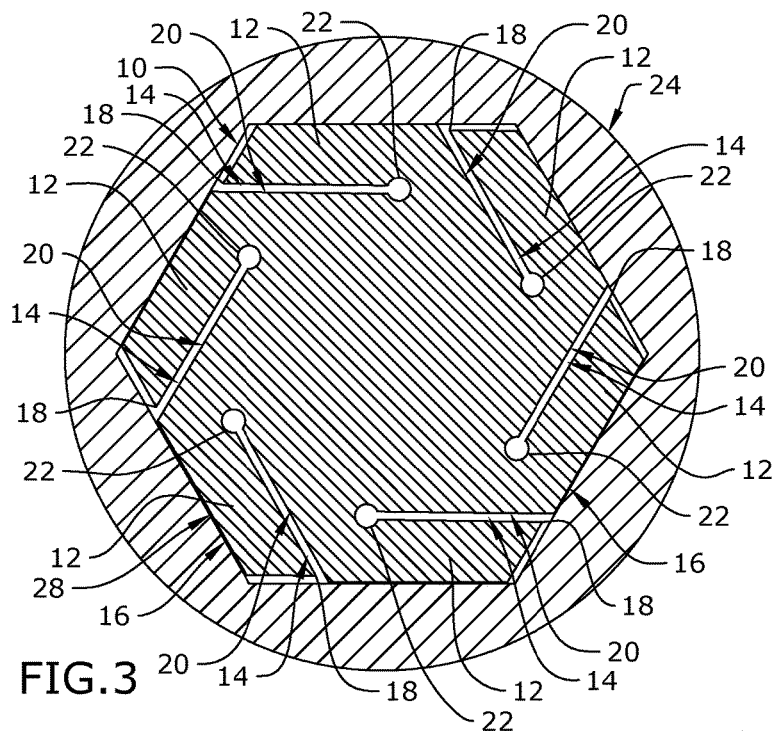
FIG. 3 is a section view along line 3-3 in FIG. 1 shown in non-maximum developed torque state.
Figure 4:
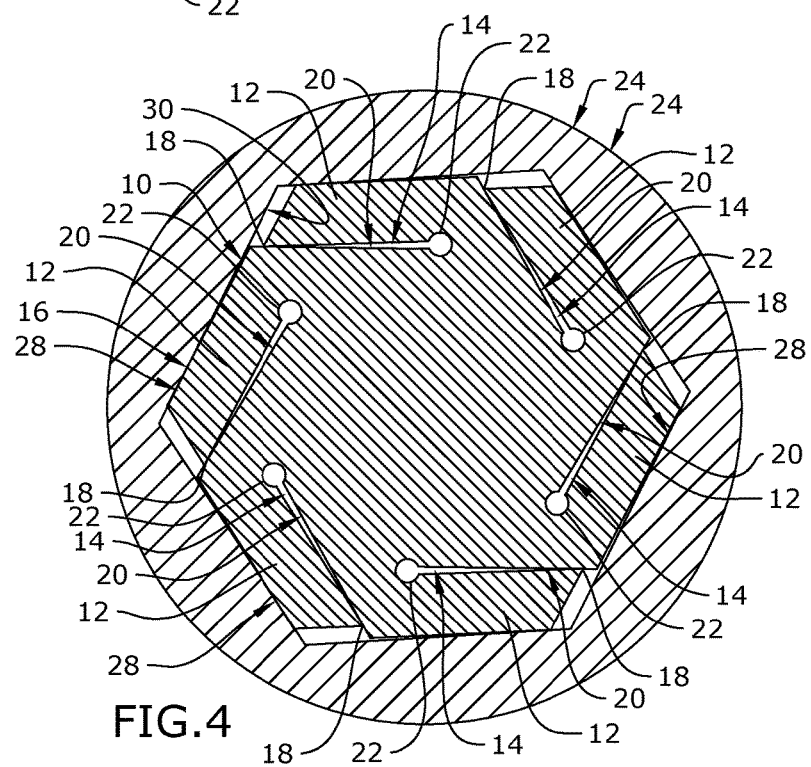
FIG. 4 is a section view line 3-3 in FIG. 1 shown in maximum developed torque state.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Over and under tightening of fasteners lead to machine failure. Over torqueing a fastener can lead to screw/bolt breakage by torsional shear of the body of the fastener as well as drive head stripping rendering further tightening or loosening of the fastener impossible. Under tightening of fasteners can lead to failure of adequately joining members, machine failure due to vibrations, reduced performance and early failure of components.

Furthermore the user has no way of knowing if the screw has been properly tightened without looking up a tightening torque value and purchasing a torque limiting wrench or driver. Torque limiting of fasteners is conventionally accomplished using a torque wrench which requires the user to set a specific value. These wrenches are expensive and require calibration. Furthermore their ability to properly limit the torque depends on components which can degrade over time or when exposed to severe ambient conditions such as corrosion and extreme heat.

Existing visual torque indicating bolts do not limit the torque and rely on the user having a visible view of the bolt's head in order to assess if the indicating feature has changed color. In essence these devices are not torque limiting but torque indicating devices. Furthermore their ability to indicate torque relies on a color changing indicator installed on the head of the screw which can produce highly variable values. Torque indicating bolts are expensive and only allow the user to see if a certain torque range has been set. These devices are not true torque limiting in nature and rely on the user having a direct line of sight on the head of the screw. Over or under tightening can still occur using these devices.

A fastener with a built in torque limiting feature greatly simplifies the user experience of tightening a screw. The user does not have to buy additional specialized equipment or be burdened by properly setting the equipment or any calibration.

FIGS. 1-4 of the drawings illustrate one embodiment 10 of the torque limiting fastener of the invention which consists of externally threaded shaft 30 and drivable head 16. The latter is depicted here as hexagonal; however, those skilled in the art will be aware that the invention is not limited to a drivable head having any particular geometry. The hexagonal head 16 comprises external faces 28 adapted to mate frictionally with internal faces (not shown) of driver tool 24. Slots 14 in head 10 extend internally from the exterior of faces 28 to optional stress relief notches 22 on a line parallel to the clockwise adjacent face. The slots 14 define torque limiting flanges/toggles 12 having surfaces 18 which, when a predetermined torque is delivered to said fastener 10 by driving tool 24, deflect toward and contact adjacent surface 20. This deflection of the flanges/toggles 12 changes the geometry of the faces 28 such that there is insufficient frictional contact thereof with the internal faces of tool 24 to deliver the torque required to drive the head 16 and threaded shaft 30.

It will be understood by those skilled in the art that the fastener of the invention is insertion torque-limiting where the screw thread is left handed and removal torque-limiting where the screw thread is right-handed.

Figure 5:
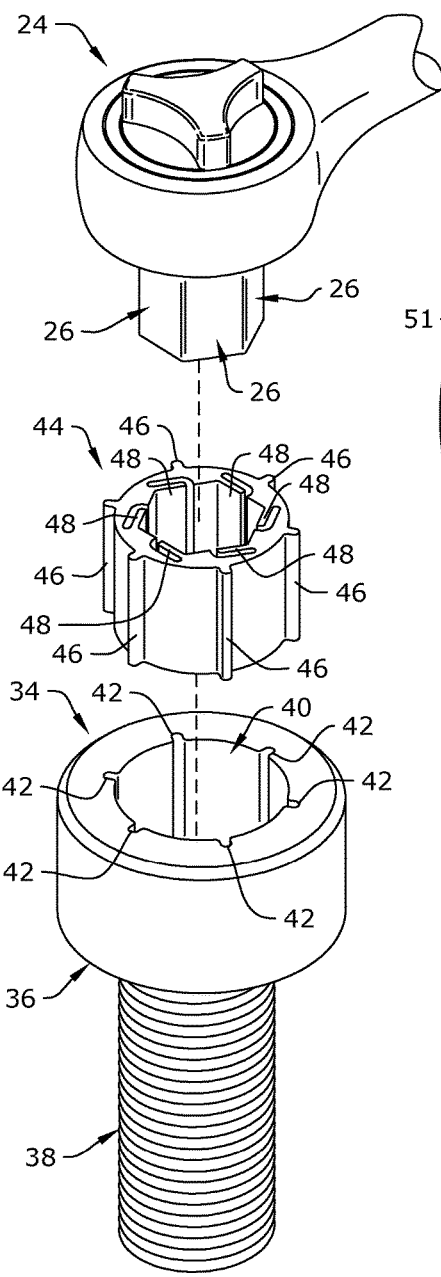
FIG. 5 is an exploded view of an alternate embodiment of the invention.
Figure 6:
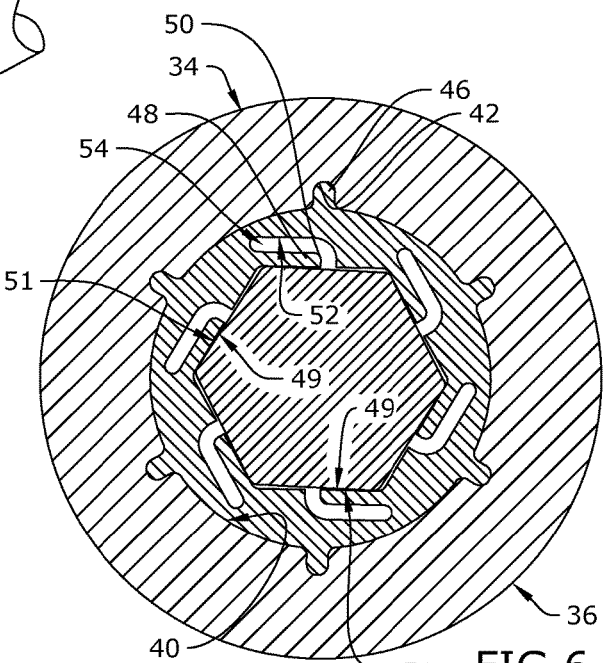
FIG. 6 is a section detail view of the alternate embodiment of FIG. 5 shown in assembled and in non-maximum-developed-torque state.
Figure 7:
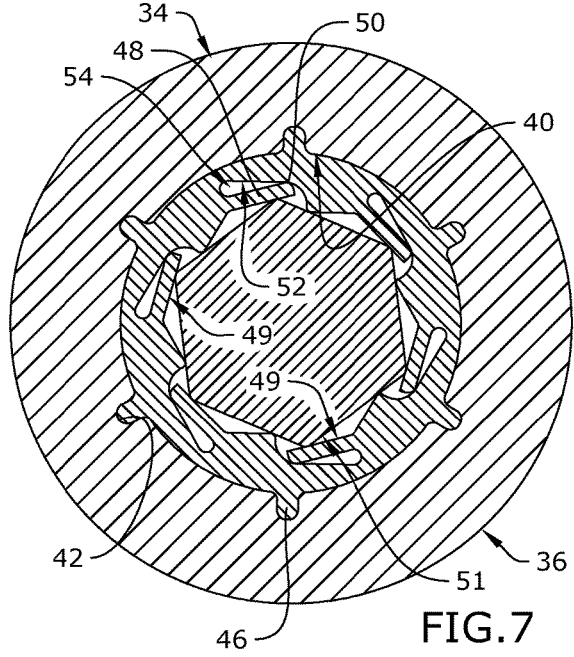
FIG. 7 is a section detail view of the alternate embodiment of FIG. 5 shown in assembled and in maximum-developed-torque state.

FIGS. 5-7 illustrate a second embodiment 34 of the invention. The torque limiting fastener which consists of externally threaded shaft 38, drivable head 36 and torque limiting insert 44, adapted for insertion into and fixation within bore 40 in head 36. Insert 44 is provided with grip protrusions 46 which mate with slots 42 in bore 40 to achieve secure fixation of insert 44 within head 36. The insert 44 is provided with internal bore 45, depicted here as hexagonal; however, those skilled in the art will be aware that, like drivable head 16 of the embodiment of FIGS. 1-4, the invention is not limited to any particular geometry of bore 45. Insert 44 comprises internal faces 49 adapted to mate frictionally with external faces 51/26 of driver tool 24. Insert 44 is provided with slots 54 which extend internally from the exterior of faces 49 on a line parallel to the clockwise adjacent face. The slots 54 define torque limiting flanges/toggles 48 having surfaces 50 which, when a predetermined torque is delivered to the fastener 34 by driving tool 24, deflect toward and contact adjacent surfaces 52. This deflection of the flanges/toggles 48 changes the geometry of the faces 49 such that there is insufficient frictional contact thereof with external faces 51/26 of tool 24 to deliver the torque required to drive the head 34 and threaded shaft 38.

Figures 8, 9:
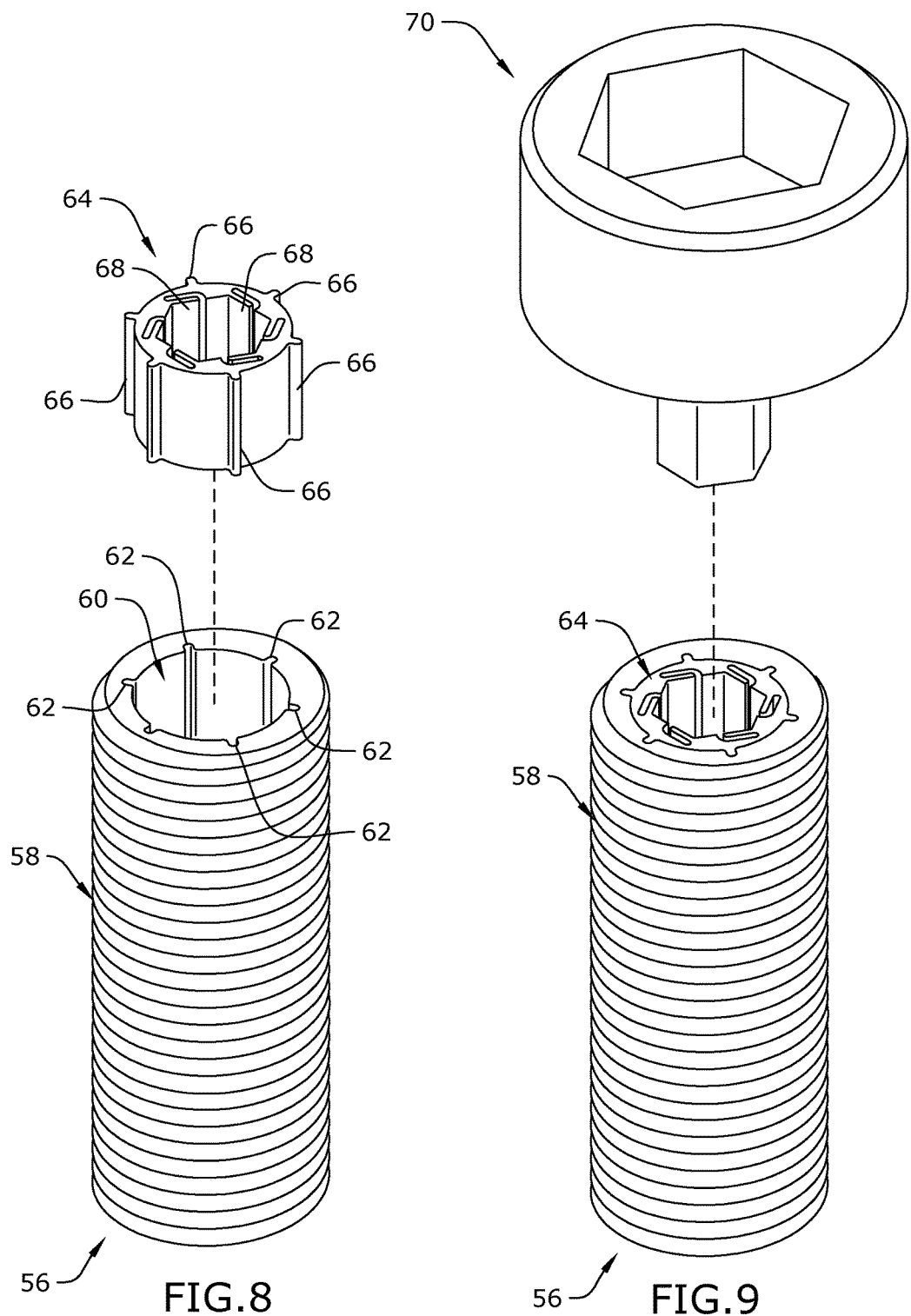
FIG. 8 is an exploded view of an alternate embodiment of the invention.
FIG. 9 is an exploded view of an alternate embodiment of the invention.

FIGS. 8-9 illustrate a third embodiment 56 of the invention comprising externally threaded shaft 58 provided with internal bore 60, torque limiting insert 64 provided with internal bore 63 and drivable head 70. The insert 64 is provided with grip protrusions 66 which mate with slots 62 in bore 60 to achieve secure fixation of insert 64 within bore 60. Similar to the insert 44 of FIGS. 5-7, insert 64 is provided with flange/toggles 68 which, when a predetermined torque is delivered to fastener 56 by driving tool 24, deflect sufficiently to changes their geometry such that there is insufficient frictional contact thereof with external faces 51/26 of tool 24 to deliver the torque required to drive the fastener 56.

It should be understood, of course, that the foregoing relates to exemplary embodiments of the invention and that modifications may be made without departing from the spirit and scope of the invention as set forth in the following claims.

What is claimed is:

1. A torque-limiting fastener, comprising: a fastener body having an externally threaded shaft and a drivable head, said head being provided with elements adapted for frictional contact with a driver capable of delivering torque to said threaded shaft, wherein said elements comprise flexible flanges/toggles that deflect towards an axis of rotation of said drivable head at a predetermined torque to prevent further frictional contact between said driver and said head elements that is sufficient to drive said fastener.

2. The fastener of claim 1 wherein said head is polygonal, said elements are the outer faces thereof, and said flanges/toggles are defined by slots extending from the exterior of each face into the interior on a line parallel to the face adjacent thereto in clockwise direction.

3. A torque-limiting fastener, comprising: a fastener body having an externally threaded shaft and a drivable head, said head being provided with elements adapted for frictional contact with a driver capable of delivering torque to said threaded shaft, wherein said elements comprise flexible flanges/toggles that deflect at a predetermined torque to prevent further frictional contact between said driver and said head elements that is sufficient to drive said fastener, said externally threaded shaft is provided with a bore formed therein with a sidewall, and said drivable head is an insert adapted for insertion into said bore and interlockable with said sidewall, said insert being provided with a polygonal bore formed therein adapted for said frictional contact with said drive, wherein said flexible flanges/toggles are defined by slots extending from the exterior of each face into the interior on a line parallel to the face adjacent thereto in clockwise direction.

* * * * *